Figure 1:
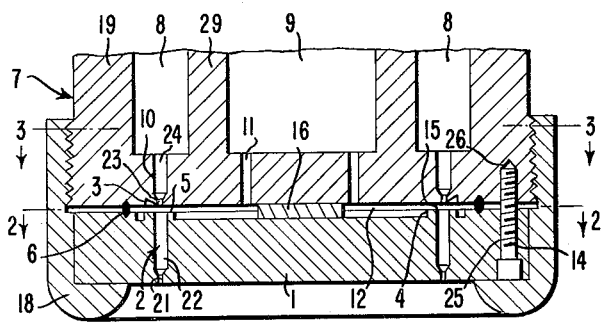
Figure 1A:
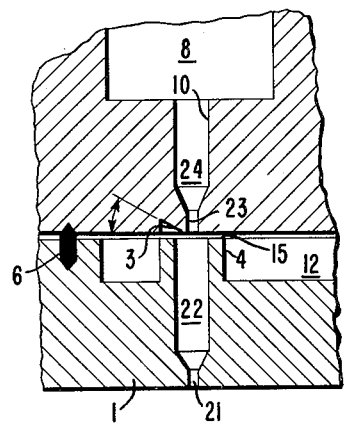

June 19, 1962 N. RADOW ET AL 3,039,174
ELONGATED COMPOSITE STRUCTURE
Filed May 12, 1958 2 Sheets-Sheet 1

INVENTORS
NORMAN RADOW
WILLIAM EARL ROSEVEARE

BY *Sol Schwartz*
ATTORNEY

June 19, 1962   N. RADOW ET AL   3,039,174
ELONGATED COMPOSITE STRUCTURE
Filed May 12, 1958   2 Sheets-Sheet 2

INVENTORS
NORMAN RADOW
WILLIAM EARL ROSEVEARE
BY
ATTORNEY

United States Patent Office
3,039,174
Patented June 19, 1962

3,039,174
ELONGATED COMPOSITE STRUCTURE
Norman Radow, Brandywine Hundred, Del., and William Earl Roseveare, Greenville, N.C., assignors to E. I. du Pont de Nemours and Company, Wilmington, Del., a corporation of Delaware
Filed May 12, 1958, Ser. No. 734,789
10 Claims. (Cl. 28—82)

This invention relates to shaped articles having in contact dissimilar polymer layers of improved adhesion and to their production.

A method for improving the adhesion between dissimilar polymers as in, for example, a laminate, has long been sought in the art. The use of cement or adhesives often has the drawback of affecting the physical properties of either or both of the two components and in addition may cause discoloration of the laminate upon weathering.

A development in the filament-forming field has been the production of composite filaments by spinning different fiber-forming materials in such a fashion that the materials form a unitary filament. Of great utility, are those unitary filaments containing the components in eccentric relationship over the cross-section of the filament. After stretching the composite filaments and relaxing or shrinking them, a difference in contraction between components will produce a crimped filament. Some combinations of fiber-forming components, which may be very desirable for this type of product since they display a large differential shrinkage and thus lead to a highly crimped yarn, are unsatisfactory since they have little adhesion to each other and the composite structure may spread apart either partly or entirely in processing or subsequent use.

One object of the present invention is to provide an improved shaped structure of at least two dissimilar polymers. A further object is to provide self-crimping, multicomponent, composite filaments with an improved adhesion between the dissimilar polymers in the structure. These and other objects will become apparent in the course of the following specification and claims.

In accordance with the present invention the improved adhesion between the different polymers in the composite structure, is obtained when one polymer has at least 50 equivalents of an acid group per $10^6$ gram of polymer, while the other polymer has at least 60 equivalents of a basic group per $10^6$ gram of polymers.

The present invention also has applicability in the field of synthetic fiber reinforced plastics wherein the tendency for fiber separation is a distinct disadvantage. This tendency is minimized by the use of reinforcing fibers of polymers having the aforementioned minimum of acid or basic groups while the plastic to be reinforced has at least the required minimum of basic or acid groups respectively.

Suitable pairs of components for use in the present invention can be found in all groups of synthetic, film-forming materials. In addition, where the intended use is in crimped filaments, the two materials should have the desired physical properties and possess sufficient difference in shrinkage. The preferred minimum difference of such shrinkage is about 3%.

Because of their commercial availability, ease of processing and excellent properties, the condensation polymers and copolymers, e.g., polyamides, polysulfonamides and polyesters and particularly those that can be readily melt spun are preferred for application in this method. Suitable polymers can be found for instance among the fiber-forming polyamides and polyesters which are described e.g., in U.S. Patents 2,071,250, 2,071,253, 2,130,523, 2,130,948, 2,190,770 and 2,465,319. The preferred group of polyamides comprises such polymers as poly(hexamethyleneadipamide), poly(hexamethylenesebacamide), poly(epsilon-caproamide) and the copolymers thereof. Among the polyesters that may be mentioned, besides poly(ethylene terephthalate), are the corresponding copolymers containing sebacic acid, adipic acid, isophthalic acid as well as the polyesters containing recurring units derived from glycols with more than two carbons in the chain, e.g., diethylene glycol, butylene glycol, decamethylene glycol and trans-bis-1,4-(hydroxymethyl)-cyclohexane, and suitable polyvinyl compounds include such polymers as polyethylene, polyacrylonitrile, polyvinyl chloride, polyvinylidene chloride, and similar polymers.

It is believed that the improved adhesion between the different polymers in the products of this invention is due to interaction between acid and basic groups of the respective polymers. Amine groups are typical of the basic groups which are suitable and may be present in condensation polymers (polyamides, polysulfonamide, polyurethanes, and polyureas) as chain end groups derived from an excess of a diamine used in the polymerization. The concentration of primary amine end groups in a polymer is limited by the thermal degradation that accompanies such groups and prevents spinning at a commercial level. The maximum permissible is about 40 equivalents of primary amine end groups per $10^6$ grams of polymer. By extruding the polymer as a core of a composite filament, concentrations of 150 and higher equivalents of amine groups per $10^6$ grams of the polymer can be used in the polymer. The sheath polymer protects the core against degradation at the spinneret face.

Tertiary amine end groups are also useful in this invention and may be obtained by the use of viscosity stabilizers in the polymerization. N-amino-alkyl morpholine can be used as taught in U.S. Patent 2,585,199.

Amine groups may also be present within the polymer chain. Such mid-chain groups can be obtained from the use of a dicarboxylic acid containing one or more tertiary amine groups such as piperazine diacetic acid, N-methyliminodiacetic acid and others as discussed in U.S. 2,274,831 issued to Hill in 1942. Soluble polymers containing secondary amino groups can be obtained by reacting a compound containing two primary amino groups and at least one secondary amino group (as 1,2-bis-aminohexylamino ethane) with an equivalent amount of a dicarboxylic acid or derivative as taught in U.S. 2,483,513. A monomer containing two primary or secondary amino groups that are amide forming and one or more tertiary amine groups can also be used as for example N,N'-bis(amino-pentyl)piperazine.

As exemplary acid groups which may be present in polymers useful for the purposes of the present invention there may be mentioned sulfonic acid and carboxy groups. Polyamides containing sulfonic acid groups can be made by the reaction of salts of sulfonated dibasic acids such as the lithium salts of sulfoisophthalic acid with a diamine.

Sulfonic acid groups can be introduced as end groups in condensation polymers by using metallic salts of sulfomonocarboxylic esters such as sodium p-carbomethoxybenzenesulfonate and dipotassium 5-carbomethoxybenzene-1,3-disulfonate and sulfomonohydric alcohols, such as sodium-3-hydroxypropane-1-sulfonate as chain terminators.

Sulfonate acid groups can be placed in mid-chain units of a polymer by using as a monomer, a dicarboxylic acid compound or its derivative containing a metallic salt of a sulfonate, such as sodium 1,8-di(carbomethoxy)naphthalene-3-sulfonate, potassium 2,5-di(carbomethoxy)benzenesulfonate, and sodium 4,4-dicarbomethoxybutane-1-sulfonate.

Carboxy groups and their salts are also useful in this invention although sulfonic acid is preferred. They can be introduced as end groups by using an excess of a dibasic acid or by degrading a polymer by various means. In the case of polyesters, chain terminators such as potassium monomethyl terephthalate, potassium hydroxybutyrate, or potassium monomethyl sebacate can be used in ester exchange polymerizations.

Carboxy groups can also be introduced to mid-chain units of a polymer. Metallic salts of carboxylic acids do not enter into an ester exchange polymerization, so that compounds such as potassium dimethyltrimesate, or the potassium salt of desoxycholic acid $(HO)_2C_{23}H_{37}COOK$ can be copolymerized with, for example, dimethyl terephthalate. Mid-chain carboxy groups can also be introduced by melt blending a polyester having predominately hydroxyl end groups with a dianhydride such as pyromellitic anhydride followed by extrusion of the modified polyester into shaped articles, the holding time at the high temperature of melt-blending and extrusion being of short duration.

Vinyl polymers containing ionic groups can be used in this invention. Basic monomers such as vinyl pyridine, beta-diethylamino vinyl ether, allyl triethyl ammonium bromide and ethyl acetiminoacrylates as disclosed in U.S. 2,698,843 can be used as homopolymers or in copolymers.

Acidic monomers such as styrene sulfonic acid, sodium allyl sulfonate, and others as disclosed in U.S. Patent 2,527,300 can also be used as homopolymers or in copolymers.

Figure 2:
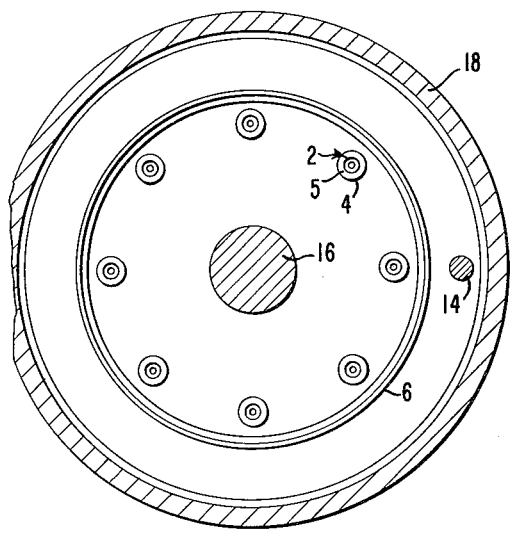
Figure 3:
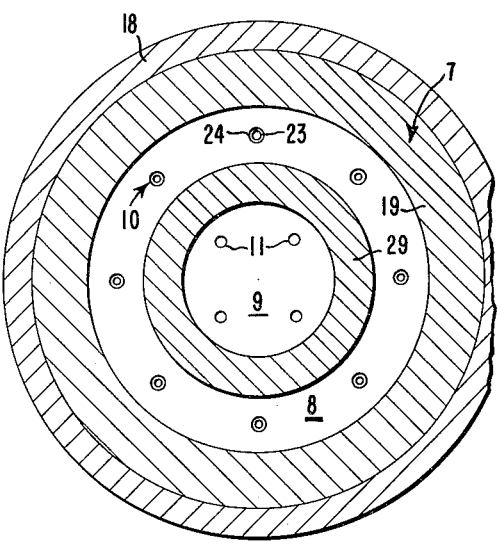

Apparatus suitable for producing the composite filaments referred to above appears in the attached drawings. FIGURE 1 is an axial longitudinal section of a spinneret assembly which can be used to make composite filaments. FIGURE 2 is a transverse cross-section of the apparatus of FIGURE 1 taken at 2—2 thereof and showing a plan of the front or bottom spinneret plate. FIGURE 3 is a transverse cross-section taken at 3—3 of FIGURE 1 to show the plan of the top of that plate thereof. FIGURE 1-A is an enlarged section of FIGURE 1.

FIGURE 1 shows in axial section a spinneret assembly useful for this purpose. Front or bottom plate 1 with orifices 2 is recessed at the back about plateau-like protrusions 4. Each orifice consists of capillary 21 at the exit and larger counterbore 22 leading to the capillary from the plateau. Back or top plate 7 is sealed against and spaced from the front plate by gasket 6 and shim 16, the former being ring-shaped and located near the periphery of the opposing faces of the two plates and the latter being disc-shaped and located concentric with the two plates. Relatively unconstricted region 12 between the two plates is interrupted at intervals by constricted regions 15 between the opposing face of the back plate and plateaus 5 of the protrusions from the front plate. The back plate is partitioned on top by outer wall 19 and inner wall 29 into annular chamber 8 and central chamber 9. The annular chamber communicates with the constricted regions between the two plates through counterbored apertures 10, consisting of terminal capillary 23 and counterbore 24, and the central chamber communicates with the intervening relatively unconstricted region through holes 11. A groove 3 has been cut as a ring around the capillaries 23 in the top plate. The two plates are retained in place by cap 18 threaded onto the end of the back plate. The upper part of the housing (not shown) receives suitable piping or other supply means for separate connection to the two chambers, which may constitute distribution or filtering spaces as desired. Pin 14 through cylindrical openings (opening 25 in the front plate and opening 26 in the back plate) near one edge of the plates ensures the desired alignment of the two plates.

FIGURE 2 shows the plan of the front plate. Appearing in this view are eight plateaus, each concentric with an extrusion orifice and uniformly spaced about a circle inside the outer gasket. FIGURE 3 shows the appearance of the back plate sectioned as indicated on FIGURE 1. Visible are the concentric outer and inner walls, the capillaries and counterbores of eight apertures spaced uniformly on a circle between the two walls, and four openings located within the central chamber defined by the inner wall.

Operation of the described apparatus in the practice of this invention is readily understood. Separate polymers are supplied to the inner and the outer chambers, respectively, of the back plate; the former flows through the openings into the relatively unconstricted space between back and front plates, through the relatively constricted regions between the plateaus and the opposing plate face, and through the extrusion orifices to form the sheath of a filament while the latter passes first through the apertures in the back plate and directly into and through the aligned orifices in the front plate to form the core of the component.

Figure 4:
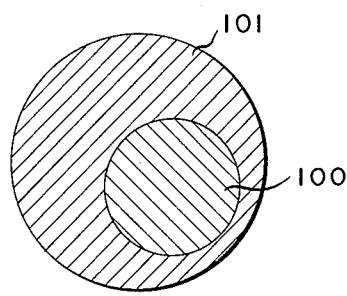

FIGURE 4 shows an enlarged cross section of a sheath-core filament which may be made in accordance with the present invention. Core 100 may represent a polymer having at least 60 equivalents of a basic group per $10^6$ grams of polymer. Sheath 101 may represent a polymer having at least 50 equivalents of an acid group per $10^6$ grams of polymer.

Figure 5:
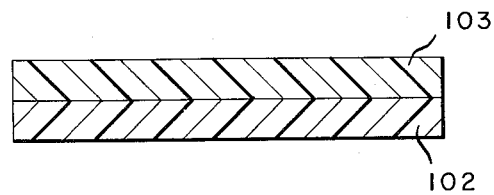

FIGURE 5 illustrates a laminated structure which may be made by hot-pressing a film of a polymer having at least 50 equivalents of an acid group per $10^6$ grams of polymer (103) against a film formed from a polymer having at least 60 equivalents of a basic group per $10^6$ grams of polymer (102).

In the examples, the relative viscosity ($\eta_r$) i.e., viscosity of a solution of polymer relative to that of the solvent, is used as a measure of the molecular weight. The polyamide solutions contained 5.5 g. of polymer in 50 ml. of 90% formic acid and the viscosity was measured at 25° C. The polyester solutions contained 2.15 g. of the polymer in 20 ml. of a 7/10 mixture of tetrachlorphenol/phenol and the viscosity was measured at 30° C.

The potential elastic extensibility of the crimped yarns which is due to the tightness of the spiral crimp developed has been termed "percent crimp elongation" and is calculated as follows:

$$\text{Percent crimp elongation} = \frac{L - L_R}{L_R} \times 100$$

where L is the length of the yarn under such tension as is required to straighten all the crimps and $L_R$ is the length of the crimped yarn after the tension is released. For a given filament construction the percent crimp elongation is proportional to the number of crimps per inch.

The following examples illustrate but are not intended to limit the present invention. Parts indicated are parts by weight.

*Example A*

A charge of 582 parts of piperazine hydrate, 105 parts of delta-chlorovaleronitrile, 700 parts sodium carbonate, 1750 parts of water, and 4 parts of potassium iodide, as catalyst, are heated at reflux with stirring for 10 hours. After cooling to room temperature, the reaction mixture is extracted with benzene and the benzene extract distilled under reduced pressure. The product is N,N'-bis(cyanobutyl)piperazine, a dinitrile having a melting point of 68 to 70° C., and a boiling point of 180°–184° C. at 0.1 to 0.3 mm.

257 parts of the dinitrile mixed with 100 parts of liquid ammonia and 40 parts Raney cobalt catalyst are hydrogenated at 135° C. and 1800 pounds/sq. in. pressure. Upon removal of the catalyst, the product N,N'-bis(aminopentyl)piperazine having a boiling point of 148–152

(0.2 to 0.4 mm.), and a melting point of 42–44° C. is distilled under reduced pressure.

The adipic acid salt of the diamine is prepared by adding a solution of 652 parts of the diamine and 500 parts of absolute alcohol to a solution of 365 parts of adipic acid and 4,000 parts absolute alcohol. After cooling, the salt is collected by filtration, washed once with cold alcohol and several times with dry ether and air dried. It has a melting point of 190–192° C.

95 parts of an aqueous solution containing 50% by weight of the above salt is placed in an evaporator with 4,000 parts of an aqueous solution containing 50% by weight hexamethylenediammonium adipate and 22 parts of acetic acid. The mixture is evaporated to a total solids content of 60% and then, while hot, charged into a nitrogen purged autoclave. During the first half hour of the polymerization cycle the system is closed while the temperature is raised to 200° C. A pressure of 250 pounds per square inch is maintained for an additional 5 hours while the temperature is slowly increased to 280° C. Pressure is then reduced to atmospheric over a 1½ hour period, the temperature being permitted to rise to 285° C. After maintaining this temperature for about 2 hours, the polymerization product (a copolyamide) is extruded as a ribbon, quenched with water and cut into flake having an $\eta_r$ of 41. The product contains 98.5 mole percent of units derived from hexamethylene diamine and 1.5 mol percent of units derived from the piperazine compound.

*Example B*

Ten parts of 5-sulfoisophthalic acid are dissolved in 100 parts of 85% methanol-15% benzene, and one part of sulfuric acid is added. A mixture of benzene, water and methanol is slowly distilled off during 24 hours a constant level of esterification mixture being maintained by continuous addition of methanol-benzene solution. Potassium acetate is added to the reaction mixture and the solid product obtained is filtered off. The product is dissolved in hot water, neutralized with sodium carbonate, and decolorized with charcoal. When the solution is filtered and cooled, crystalline sodium 3,5-di(carbomethoxy)benzenesulfonate is obtained. 1.6 parts of this product are added to 49 parts of dimethyl terephthalate, 34.5 parts of ethylene glycol, 0.067 part of calcium acetate, and 0.015 part of antimony trioxide. The mixture is heated for three hours, during which time the temperature rises from 165° C. to 220° C. with evolution of methanol. A portion of the polymer is removed having an $\eta_r$ of 5–6. The pressure is then reduced to 1 mm. of mercury and the temperature is increased to 275° C. After 2–3 hours a polymer is obtained having an $\eta_r$ of 12–15 and containing 104 equivalents of sulfonic acid (actually present as the sodium salt) per $10^6$ grams of polymer as calculated from sulfur analysis (0.33%).

*Example I*

Using 6″ x 6″ electrically heated plates in a laboratory press, 5 mil thick films are molded from flakes of the following polymers: Poly(hexamethyleneadipamide) (66 nylon) of $\eta_r$ 41 having about 45 equivalents of amine end groups per $10^6$ grams of polymer, the copolyamide prepared in Example A, poly(ethylene terephthalate) of $\eta_r$ 19 containing 22 equivalents of carboxyl groups per $10^6$ grams of polymer, the copolyester prepared as in Example B of $\eta_r$ 10.7 containing 104 equivalents of sulfonic acid groups per $10^6$ grams of polymer and a copolyester prepared as in Example B but containing 5 mol percent of potassium sulfodimethyl isophthalate (copolyester C) with $\eta_r$ of 18.3 and containing 260 equivalents of sulfonic acid per $10^6$ grams of polymer. Pairs of films were placed in contact with each other without the use of any added adhesive, backed by aluminum foil and heated together at their minimum sticking temperature for 1 minute under 5–10 p.s.i. pressure. The pair of films was then removed, allowed to cool and separated or attempted to be separated by hand. The results obtained with the various pairs of films are shown below:

| Film A | Film B | Temperature of Pressing, °C. | Adhesion |
|---|---|---|---|
| 66 Nylon | 66 Nylon | 260 | Fuses—no Separation. |
| Do | Copolyamide from Example A. | 260 | Do. |
| Polyester | 66 Nylon | 270 | Separates. |
| Do | Copolyamide from Example A. | 260 | Sepatates with some difficulty. |
| Copolyester from Example B. | 66 Nylon | 260 | Do. |
| Do | Copolyamide from Example A. | 225 | Does not separate. |
| Copolyester C | do | 260 | Do. |

The above data indicate that the presence of sulfonic acid groups in a polyester causes an increase in the adhesion to a polyamide with the normal amount of amine groups present in the polymer. An even greater degree of adhesion is seen when the amount of amine groups in the polymer is increased by using copolyamide A (estimated 67 equivalents of primary amino end groups per $10^6$ grams of polymer and 132 equivalents of intralinear amine groups per $10^6$ grams of polymer from titration of the polymer).

As a further test on the film results the various polymers were melted in a test tube under an atmosphere of nitrogen and the 1.5 inch diameter tubes of polymer permitted to cool, removed from the tube and cut along their axis. Half cylinders of different polymers were than placed together in another tube heated at 280° C. under an atmosphere of nitrogen. The resulting side-by-side plug was removed from the tube after cooling and cut into ⅛ inch circular segments. The segments were flexed until they fractured. The following observations were made:

| Plug 1 | Plug 2 | Comments |
|---|---|---|
| 66 Nylon | 66 Nylon | Fuses. |
| Do | Copolyamide of Example A. | Do. |
| Polyester | 66 Nylon | Does not adhere. |
| Do | Copolyamide of Example A. | Very slight adherence. |
| Copolyester of Example B | 66 Nylon | Slight adherence. |
| Do | Copolyamide of Example A. | Excellent adherence. |

*Example II*

Using a 17-hole spinneret similar to that shown in FIGURE 1 the copolyamide of Example A was spun as the sheaths and the copolyester of Example B was spun as the cores of composite filaments. The polymers were extruded at 285° C. and the yarn wound up at 800 y.p.m. The resultant straight, uncrimped yarn was drawn 3.27× over a pin heated to 83° C. followed by a passage over a plate heated to 160° C. The yarn was then placed in boiling water for 5 minutes and shrank 10%. The shrinking caused the individual filaments to spontaneously crimp and form helical coils at about 18–22 helical coils per inch.

The above spin was repeated using 66 nylon of $\eta_r$ 41 as a sheath and and poly(ethylene terephthalate) of $\eta_r$ 17 as a core to make item 2 which afforded a crimped yarn on shrinking.

The above two crimped yarns and a 66 nylon yarn made of uncrimped continuous filaments (item 3) (all of same approximate denier per filament) were scoured in a conventional hot soap solution, rinsed and dyed in an acid dye bath which was specific for the polyamide having the following composition for each gram of fiber:

| | | |
|---|---|---|
| The sodium salt of 1-amino-4-anilino-2-anthraquinone sulfonic acid | g | 0.005 |
| Distilled water | ml | 50 |
| Acetic acid (7% aqueous) | ml | 0.35 |
| Sodium lauryl sulfate | g | 0.005 |

The yarns were immersed in the dye bath at room temperature and the temperature raised to 95° C. in 20 minutes, kept at 95° C. for 15 minutes, rinsed and dried.

The dry dyed yarns (medium blue in color) were then plied to ca. 300 total denier and tested in a yarn-on-yarn abrasion tester. In this tester one end of the yarn is clamped to a rocking arm that imparts a vertical motion to the yarn. The middle portion of the pendant yarn is looped over a steel pin down around another pin located below the first pin and up over the first loop of yarn so that the yarn rubs on an upper portion of the same yarn to the left of the two pins. The bottom portion of the yarn is then loaded at 5% of the yarn breaking strength. The arms are rocked at a constant speed (120 cycles per minute) and the cycles counted until the appearance of fuzz and until the yarn breaks. Results of the abrasion test are shown below:

| Yarn Item | Crimp Elongation, percent | No. of Cycles Required to | |
|---|---|---|---|
| | | Fuzz | Break |
| No. 1 | 250 | No fuzz by 1,400 cycles | 1,400 |
| No. 2 | 260 | 200 | 600 |
| No. 3 | | No fuzz by 2,000 cycles | 2,000 |

Dye non-uniformities giving a frosted effect were observed with item No. 2 soon after 200 cycles and postulated as caused by separation of the sheath and the core at sections along the length of the abraded filaments as determined by microscopic examination. Item No. 1 had no separation of sheath and core along the length of the abraded filaments and only a slight tendency towards splitting at the severed ends of the composite filaments.

The above yarn-on-yarn abrasion results were confirmed by abrasion of knitted tubings of the above yarns against a woven fabric made of 66 nylon continuous filament. Tubings made from item 1 and item 3 exhibited no fuzzing or dye differences after the abrading although fuzzing was quite apparent with a similar treatment on the tubing from item No. 2 above.

*Example III*

A modified poly(ethylene terephthalate) was made by polymerizing dimethyl terephthalate in the presence of 4 mol percent of meta-sodium sulfomethyl benzoate as an end group stabilizer. The copolyester had an $\eta_r$ of 12 and had an estimated 208 equivalents of sulfonic acid end groups per $10^6$ grams of polymer. A film made of this polymer and pressed against a film of the copolyamide of Example A under the conditions of Example I showed excellent adhesion to the copolyamide.

The composite filaments have been produced in the examples by the melt spinning technique. Other spinning methods such as "plasticized melt" spinning, dry spinning, wet spinning, can also be employed successfully. In some instances, particularly when the melting behavior or the solubility of the components in a combination would not permit spinning the components by similar methods, a combination of dissimilar methods is indicated. Thus, for instance, one component, preferably the component forming the sheath can be spun as a solution in a high boiling solvent or as a plasticized melt, while the core-forming component is extruded as a molten polymer. In these instances, the solvents or plasticizers may be wholly or partially removed subsequently, preferably by washing them out by the help of low boiling solvents.

The shaped products of this invention afford a higher degree of adhesion between dissimilar polymers than has been heretofore obtained without the use of added adhesive. This is of particular utility in the field of helically crimped composite filaments. Components offering the advantage of superior physical and crimping properties can be used that were heretofore unsatisfactory because of physical failure of the filaments or poor appearance on wear of such filaments. Such self-crimped filaments can be woven into fabrics or cut into staple and spun into yarns before shrinkage and self-crimping, followed by the crimping step in the fabricated article. Alternatively they can be shrunk in the continuous filament or staple form and articles fabricated directly from the crimped fibers.

While certain specific dissimilar polymer combinations have been illustrated, the invention is by no means limited thereto. It has general applicability in composite articles having an interface formed by two or more polymers whose chemical composition is sufficiently different so that poor adhesion results. Generally, such polymers are incompatible as evidenced by the fact that melts or solutions of a mixture of the dissimilar polymers yield cloudy films. The chemical difference may be the presence of different connecting links between repeating units of the respective polymers such as is the case in polyamide-polyester, polyurethane-polyester, and polyurea-polyester combinations. On the other hand the chemical difference may derive from different substituents on the repeating units as for example $$-CH_2C(CN)-, -CH_2-C(Cl)-,$$
$$-CH_2C(COOCH_3)-, -CH_2C(OH)-,$$

etc. Both types of chemical dissimilarity may also be present.

Polyacrylonitrile and polyvinyl acetate are illustrative of a dissimilar polymer combination as disclosed above. According to the present invention, however, dissimilar polymer combinations include those wherein one of the polymers has some repeating units or connecting links in common to the other polymer but which contains 30% or more of a different unit or link as described above. Exemplary of such a combination is polyacrylonitrile and an acrylonitrile-vinyl chloride copolymer (40/60% by weight).

We claim:
1. An elongated flexible shaped composite structure comprised of at least two adjoining layers of dissimilar polymers selected from the group consisting of synthetic condensation and addition polymers which in admixture yield cloudy films, said layers having adjacent surfaces in intimate adhering contact with each other, one of said dissimilar polymers having at least 50 equivalents of an acid group per $10^6$ grams of polymer and the other of said dissimilar polymers having at least 60 equivalents of a basic group per $10^6$ grams of polymer, said acid and basic groups being chemically bonded to the polymer chains of said polymers.

2. The structure of claim 1 wherein the acid group is sulfonic acid and the basic group is an amino group.

3. The structure of claim 1 wherein the acid and basic groups are carboxy and amino respectively.

4. A composite textile filament comprised of a sheath and a core of dissimilar polymers selected from the group consisting of synthetic condensation and addition polymers which in admixture yield cloudy films, one of said dissimilar polymers having at least 50 equivalents of an acid group per $10^6$ grams of polymer and the other of said polymers having at least 60 equivalents of a basic group per $10^6$ grams of polymer, said acid and basic groups being chemically bonded to the polymer chains of said polymers.

5. The filament of claim 4 wherein the acid group is a sulfonic acid group and the basic group is an amino group.

6. The filament of claim 4 wherein the acid and basic groups are carboxy and amino groups, respectively.

7. The filament of claim 4 wherein said polymer having acid groups is a polyester having sulfonic acid groups and said other polymer having basic groups is a polyamide having amino groups.

8. The filament of claim 4 wherein the core is eccentrically located with respect to the sheath and differs in shrinkage therefrom.

9. An elongated flexible shaped composite structure comprised of adjoining dissimilar polymer layers, the adjacent surfaces of said layers being in intimate adhering contact with each other, one of said layers comprising a polyester having at least 50 equivalents of a sulfonic acid group per $10^6$ grams of polymer and said other layer comprising a polyamide having at least 60 equivalents of a basic group per $10^6$ grams of polymer, said acid and basic groups being chemically bonded to the polymer chains of said polymers.

10. A shaped structure according to claim 1 in the form of a composite filament.

References Cited in the file of this patent

UNITED STATES PATENTS

| | | |
|---|---|---|
| 1,951,094 | Koch | Mar. 13, 1934 |
| 2,087,389 | Stark | July 20, 1937 |
| 2,232,318 | Esselman et al. | Feb. 18, 1941 |
| 2,347,525 | Thinius | Apr. 25, 1944 |
| 2,439,813 | Kulp et al. | Apr. 20, 1948 |
| 2,571,457 | Ladisch | Oct. 16, 1951 |
| 2,612,679 | Ladisch | Oct. 7, 1952 |
| 2,674,025 | Ladisch | Apr. 6, 1954 |

FOREIGN PATENTS

| | | |
|---|---|---|
| 744,112 | Germany | Jan. 10, 1944 |
| 514,638 | Great Britain | Nov. 14, 1939 |